Oct. 21, 1930. J. C. McCLURKIN 1,779,101

DITCHER GUIDE

Filed Sept. 7, 1928 2 Sheets-Sheet 2

JOHN C. MCCLURKIN
Inventor

By C.A.Snow&Co.
Attorneys.

Patented Oct. 21, 1930

1,779,101

UNITED STATES PATENT OFFICE

JOHN C. McCLURKIN, OF LAKIN, KANSAS

DITCHER GUIDE

Application filed September 7, 1928. Serial No. 304,557.

This invention aims to provide novel means whereby one side of a ditcher may be adjusted vertically to control the amount of dirt that the mold-board carries laterally out of the ditch.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:—

Figure 1:
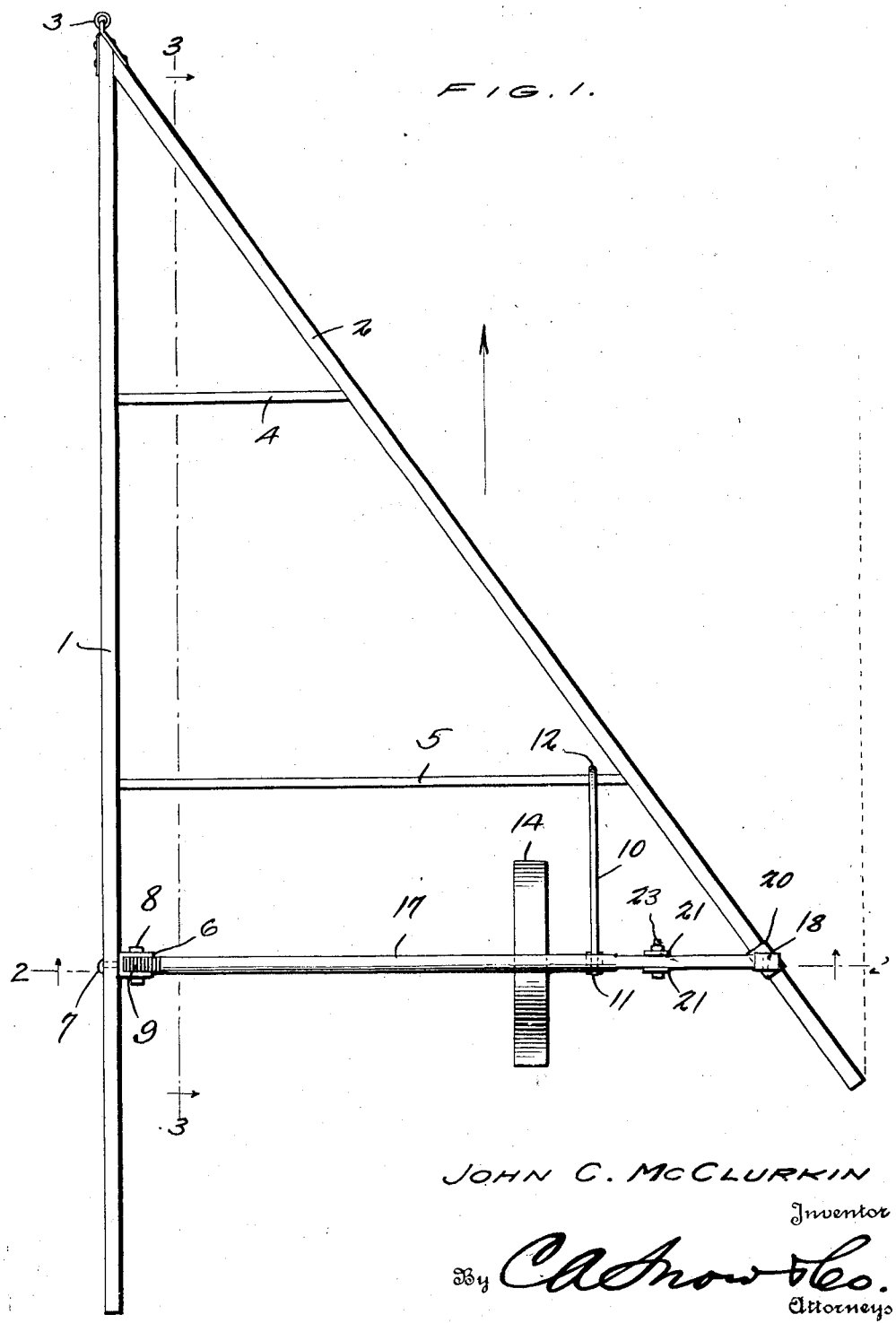
Figure 1 shows in top plan, a ditcher equipped with the device forming the subject matter of this application.

In Figure 1 of the drawings, there is shown a ditcher of simple form including a landside 1 and a mold-board 2 disposed at an acute angle to each other, there being a draft hitch 3 at the angle formed by the landside and the moldboard. The landside and the moldboard are connected by any desired number of transverse braces 4 and 5.

A U-shaped bracket 6 may be connected by securing elements 7 to the landside 1. The bracket 6 carries a pivot element 8 on which one end of an axle 9 is mounted to swing vertically. The numeral 10 designates a tie rod, the rear end 11 of which is connected loosely, in any suitable way, to the axle 9. The forward end of the tie rod 10 is connected by a hook 12, or otherwise, to the brace 5. The construction is such that the axle 9 can swing up and down, for adjustment, in approximately vertical plane, on the pivot element 8.

A ground wheel 14 is journaled for rotation on the axle 9. The axle 9 has a plurality of openings 15 which are spaced apart longitudinally of the axle. The openings 15 are adapted to receive detachable fastening devices 16, located on opposite sides of the wheel 14 and holding it in place for rotation, it being possible, nevertheless, to adjust the ground wheel 14 along the axle 9, as occasion may require.

Figure 2:
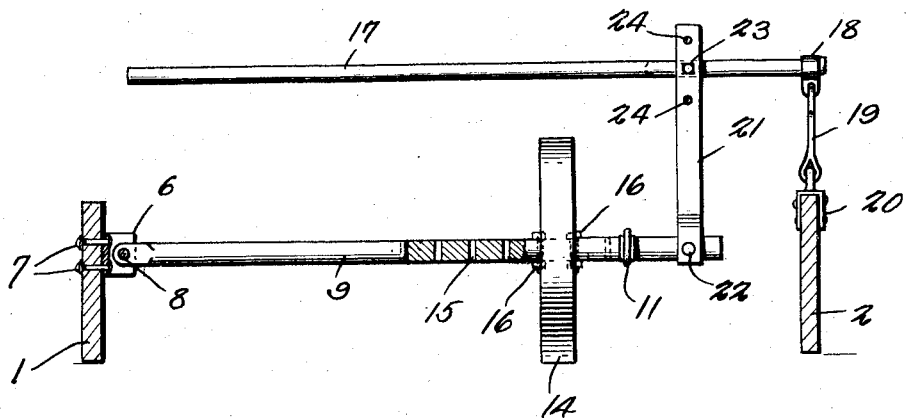
Figure 2 is a transverse section taken approximately on the line 2—2 of Figure 1.
Figure 3:
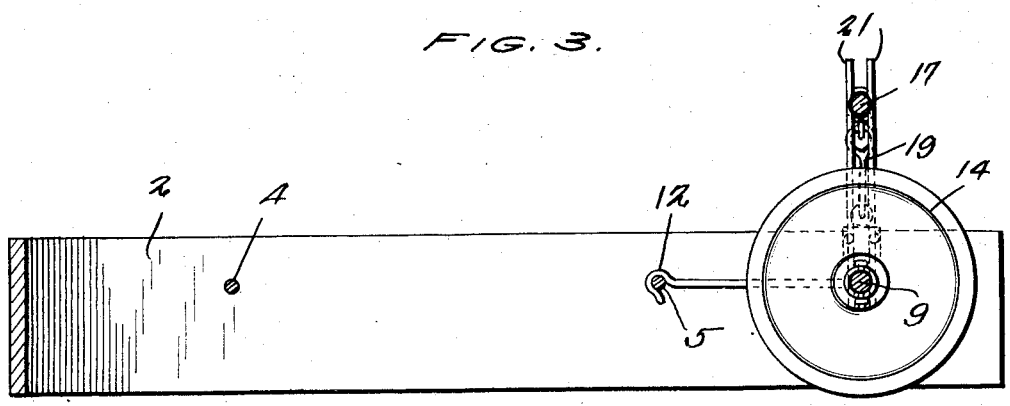
Figure 3 is a section on the line 3—3 of Figure 1.

A lever 17 is located above the axle 9. The outer end of the lever 17 is connected by a yoke 18, a pivoted link 19, and an anchor 20, to the upper edge of the moldboard 2, as shown in Figure 2 of the drawings. Connections 21, in the form of rigid straps, are provided. The inner end of the axle 9 is located between the lower ends of the straps 21, and the lower ends of the straps are pivotally connected to the inner end of the axle, as indicated at 22. The straps 21 are connected with the intermediate portion of the lever 17 by means of a pivot element 23, adapted to be mounted for adjustment, in any of a plurality of holes 24 formed in the lever 17.

In practical operation, the implement is drawn along a shallow ditch, such as an irrigation ditch, with the landside 1 in contact with one side wall of the ditch, the moldboard 2 extending upwardly, on a slant, out of the ditch.

As the ditcher is pulled along through a ditch, the moldboard 2 carries the dirt up and out of the ditch, and, thus, the ditch is cleaned out. It very often happens that the moldboard gets too much dirt in front of it, thereby throwing the dirt out of line or causing the point of the ditcher to dig into one side of the ditch: and in the ordinary operation of the machine, it is desirable to regulate the amount of dirt that the moldboard 2 rolls laterally out of the ditch, as the ditcher moves forwardly. Such a regulation or adjustment can be effected by pressing downwardly on the end of the lever 17, the axle 9, the ground wheel 14, and the connections 21 forming a fulcrum, the moldboard 2 being hoisted up as much as the operator may desire, through the instrumentality of the yoke 18, the link 19 and the anchor 20. Because the axle 9 is pivotally mounted at 8 on the landside 1, and can swing vertically, the wheel 14 will move up and down and follow irregularities in the ground, without attention on the part of the operator, when the lever 17 is not in use.

Owing to the fact that the moldboard 2 can be raised, upon occasion, a governing supply of dirt may be permitted to slip under the moldboard, and the amount of dirt that the moldboard scrapes out of the ditch can be regulated to suit the user.

What is claimed is:—

1. The combination with a ditcher, of a vertically movable axle connected directly to one side of the ditcher, a lever connected directly to the opposite side of the ditcher and disposed in approximate parallelism to the axle, a fulcrum connection between the lever and the axle and a ground wheel journaled on the axle.

2. In a device of the class described, an axle, means for connecting the axle directly to one side of a ditcher, a lever, means for connecting the lever directly to the opposite side of the ditcher, a fulcrum connection joining the lever and the axle, a ground wheel journaled for rotation on the axle, and means for holding the ground wheel in adjusted positions longitudinally of the axle.

3. In a device of the class described, an axle, a rotatable ground wheel carried by the axle, means for connecting the axle directly to one side of a ditcher for vertical swinging movement, a lever disposed in approximate parallelism to the axle, means for connecting the lever directly with the opposite side of a ditcher for vertical swinging movement, a fulcrum connection pivoted to the intermediate portion of the lever and to the inner end of the axle and a ground wheel journaled on the axle and located between the first specified side of the ditcher and the connection.

In testimony that I claim the foregoing as my own, I have hereto affixed my signature.

JOHN C. McCLURKIN.